(12) United States Patent
Lee et al.

(10) Patent No.: US 10,750,344 B2
(45) Date of Patent: Aug. 18, 2020

(54) WIRELESS COMMUNICATION SYSTEM, COMMUNICATION METHOD AND PORTABLE TRANSCEIVER DEVICE

(71) Applicant: KIWI TECHNOLOGY INC., Hsinchu County (TW)

(72) Inventors: Hsin-Hsin Lee, Hsinchu County (TW); Jian-Hong Liu, Hsinchu County (TW); Kuo-Chung Gan, Hsinchu County (TW)

(73) Assignee: KIWI TECHNOLOGY INC., Hsinchu County (TW)

( * ) Notice: Subject to any disclaimer, the term of this patent is extended or adjusted under 35 U.S.C. 154(b) by 0 days.

(21) Appl. No.: 16/220,697

(22) Filed: Dec. 14, 2018

(65) Prior Publication Data

US 2019/0349737 A1 Nov. 14, 2019

(30) Foreign Application Priority Data

May 9, 2018 (TW) .............................. 107115752 A

(51) Int. Cl.
*H04W 76/14* (2018.01)
*H04W 4/90* (2018.01)
(Continued)

(52) U.S. Cl.
CPC ............ *H04W 4/90* (2018.02); *H04B 17/327* (2015.01); *H04W 8/005* (2013.01); *H04W 36/30* (2013.01); *H04W 74/085* (2013.01); *H04W 76/14* (2018.02)

(58) Field of Classification Search
CPC ....... H04W 4/90; H04W 8/005; H04W 36/30; H04W 74/085; H04W 40/24;
(Continued)

(56) References Cited

U.S. PATENT DOCUMENTS 9,860,677 B1 * 1/2018 Agerstam ............... H04L 67/28
2018/0062873 A1 3/2018 Chiang et al.
(Continued)

FOREIGN PATENT DOCUMENTS

CN 105764032 A 7/2016
CN 107360539 A 11/2017
(Continued)

*Primary Examiner* — Marcus Hammonds
(74) *Attorney, Agent, or Firm* — Li & Cai Intellectual Property (USA) Office

(57) ABSTRACT

A wireless communication system, a communication method, and a portable transceiver device are provided. The wireless communication system includes a server, a plurality of gateway devices and user-end portable transceivers that are interconnected by a wireless WAN protocol, e.g. LoRa. Each portable transceiver connects a user device via a near-end wireless communication protocol that allows the user device to connect with the server via a gateway device. After the user device sends a message through the portable transceiver, the server discovers another portable transceiver and another gateway device according to a destination address. Thereby, the message can be transmitted via this connection, or a direct voice communication can be performed via a communication channel over this connection. The communication system therefore provides a communication service under the wireless WAN protocol that is an alternative to traditional mobile communications.

17 Claims, 11 Drawing Sheets

(51) Int. Cl.
*H04W 74/08* (2009.01)
*H04W 8/00* (2009.01)
*H04W 36/30* (2009.01)
*H04B 17/327* (2015.01)

(58) Field of Classification Search
CPC ..... H04W 40/22; H04W 84/04; H04W 76/14; H04W 92/18; H04B 17/327; H04B 17/318; H04B 17/382
See application file for complete search history.

(56) References Cited

U.S. PATENT DOCUMENTS

| | | | |
|---|---|---|---|
| 2019/0021016 A1* | 1/2019 | Radmand | H04W 24/08 |
| 2019/0053180 A1* | 2/2019 | Lalam | H04W 72/1278 |
| 2019/0075165 A1* | 3/2019 | Jiang | H04L 67/12 |
| 2019/0132905 A1* | 5/2019 | Liu | H04W 88/16 |
| 2019/0281455 A1* | 9/2019 | Luo | H04L 12/66 |

FOREIGN PATENT DOCUMENTS

| | | | |
|---|---|---|---|
| JP | 2000324553 A | 11/2000 |
| JP | 2004153802 A | 5/2004 |
| JP | 200910766 A | 1/2009 |
| JP | 2009206805 A | 9/2009 |
| JP | 201062761 A | 3/2010 |
| JP | 2014150336 A | 8/2014 |
| JP | 2014175784 A | 9/2014 |

* cited by examiner

_(1)_

WIRELESS COMMUNICATION SYSTEM, COMMUNICATION METHOD AND PORTABLE TRANSCEIVER DEVICE

CROSS-REFERENCE TO RELATED PATENT APPLICATION

This application claims the benefit of priority to Taiwan Patent Application No. 107115752, filed on May 9, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure is generally related to a wireless communication system and a communication method, and in particular to a wireless communication system that utilizes a portable transceiver device to communicate with a user device via a gateway device, and a communication method thereof.

BACKGROUND OF THE DISCLOSURE

The widespread mobile communication technology such as 3G, 4G or 5G telecommunication standard relies on a mobile network base station near a user-end mobile device to forward the voice or data generated by the mobile device to a destination. The voice or data is converted to RF signals in the base station and transmitted to a mobile communication network or a wired network. The base station is in charge of the crucial function of signal conversion over the mobile communication network between the two parties.

However, the mobile communication will fail when the base station suffers power interruption, man-made damage, or natural disaster. Therefore, to ensure that the communication is not affected, the general measure is to strengthen the structural design of the base station, use a power backup mechanism or prepare a second communication backup.

SUMMARY OF THE DISCLOSURE

The disclosure is related to a wireless communication system, a voice communication method and a portable transceiver device. The system is built on a specific communication protocol that provides a user with another voice communication scheme. In addition to utilizing a conventional mobile communication network to be a backup scheme, the system can be applicable to an area or a specific site uncovered by the conventional mobile communication network.

In one embodiment of the disclosure, the wireless communication system includes a server, a plurality of gateway devices and a plurality of portable transceiver devices. Each of the portable transceiver devices serves one user. The portable transceiver device allows a user device to link to a server via a gateway device and therefore communicate with another portable transceiver device.

Preferably, the wireless communication system performs a communication method that utilizes a first portable transceiver device to serve a user device and also link to a first gateway device via another end. When the first portable transceiver device issues a message with a destination, the message is delivered to the server via the first gateway device. The server can discover an address of a second portable transceiver device according to the destination, and also obtain a second gateway device linked to the second portable transceiver device. Therefore, the server transmits the message to the second portable transceiver device according to the address of the second portable transceiver device.

Furthermore, every portable transceiver device performs a near-end wireless communication protocol for linking with the user device. The wireless communication protocol can be Bluetooth™ communication protocol. The portable transceiver device, the gateway device and the server can be communicated with each other via a wireless WAN communication protocol, e.g. LoRa.

Further, every gateway device includes one or more wireless gateway modules that can connect with the portable transceiver devices by a multi-channel technology for receiving the messages from all the portable transceiver devices. The gateway device includes at least one wireless transmission module. After deciding a transmission channel, the gateway device is used to transmit the message received by the wireless gateway module. The gateway device includes a control circuit for controlling operations of the electronic elements of the gateway device.

In one further embodiment of the disclosure, when transmitting data or voice packets, the data are buffered and stored into a memory and are then transmitted if a target portable transceiver device is discovered.

In one embodiment of the disclosure, when the user device conducts a direct voice communication via the portable transceiver device, a communication request is generated. The communication request is then transmitted to the gateway device. When a transmission channel is determined, the communication request is transmitted to the target gateway device and the portable transceiver device via the server. A communication channel is established between two portable transceiver devices for conducting the direct voice communication.

The disclosure is related to the portable transceiver device in the wireless communication system. The portable transceiver device operates with the user device. The portable transceiver device allows the user device to be operated in the wireless communication system. The portable transceiver device essentially includes a controller, a communication module that performs a near-end wireless communication protocol for linking with the user device, and a transmission module and a receiving module that performs a wireless WAN communication protocol. The wireless WAN communication protocol can be a LoRa protocol.

In the wireless communication system, the portable transceiver device allows the user device to link with the server via the gateway device, and also with another portable transceiver device for communication.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
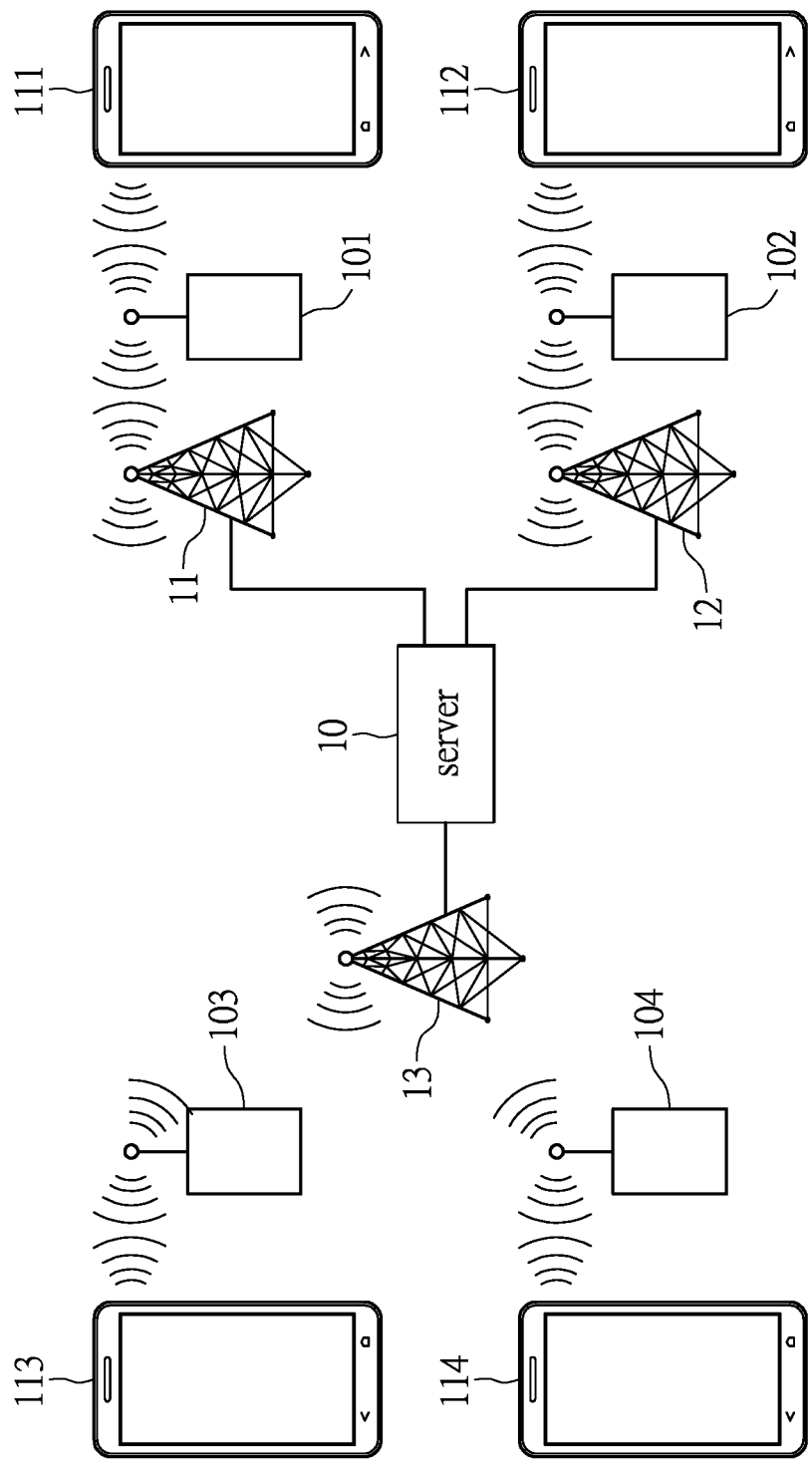
FIG. 1 shows a schematic diagram depicting a framework of a wireless communication system according to one embodiment of the disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is related to a wireless communication system, a communication method and a portable transceiver device. A user device is allowed to connect with a wireless communication system for conduct data and voice communication. The system includes a server, a plurality of gateway devices and a plurality of portable transceiver devices. The devices are communicated with each other through a wireless WAN communication protocol. The user-end portable transceiver device is connected with the user device through a near-end wireless communication protocol. The system allows the user device to connect with a gateway device of the system, and then connect with the server. When the user device generates a message, the server discovers another portable transceiver device according to a destination to obtain the gateway device for transmitting the message. Further, a communication channel is established for conducting voice communication.

Reference is made to FIG. 1 that schematically shows a framework of the wireless communication system according to one of the embodiments of the disclosure. A server 10 is shown in FIG. 1. The server 10 expands its signal coverage through the gateway devices that act as base stations disposed at different locations. The gateway devices are such as a first gateway device 11, a second gateway device 12 and a third gateway device 13. A portable transceiver device is disposed at a user-end location. The portable transceiver device, e.g. a first portable transceiver device 101, a second portable transceiver device 102, a third portable transceiver device 103, or a fourth portable transceiver device 104, is a compact type transceiver that supports a near-end wireless communication protocol. The portable transceiver device allows the user device, e.g. a first user device 111, a second user device 112, a third user device 113 or a fourth user device 114, to connect with the wireless communication system after the user device is connected or paired with the portable transceiver device.

In the current embodiment, the first user device 111 is connected with the first portable transceiver device 101. The connection there-between can be implemented by Bluetooth™ protocol or WiFi™ protocol. The first portable transceiver device 101 acts as a node of the wireless communication system, and allows the first user device 111 originally utilizing 3G, 4G or a wireless local area network to connect with the first gateway device 11 and join the wireless communication system.

Still further, the second user device 112 connects with the second gateway device 12 via the second portable transceiver device 102. The third user device 113 connects with the third gateway device 13 via the third portable transceiver device 103. The fourth user device 114 connects with the third gateway device 13 via the fourth portable transceiver device 104. The nodes are communicated with each other for data delivery or voice/video communication through the server 10. While the server 10 implements the function of exchanging voice packets, the system provides the user device with another voice communication solution via the portable transceiver device. This solution for voice communication can act as a backup solution for the conventional mobile communication and can be applied in a situation when the conventional mobile communication network fails to provide coverage or in a field that requires a specific communication solution.

According to the embodiment of the wireless communication system, a communication service implemented under a wireless WAN communication protocol is provided, which is an alternative to the conventional mobile communication. The mentioned wireless WAN communication protocol can be implemented in a LoRa protocol or the like.

The LoRa protocol is generally adapted to an application, e.g. IoT that features such as long-distance communication, low power consumption, and stable transmission. However, the kind of protocol adapted to IoT application may not be suitable for delivering a large amount of data such as voice packets. Therefore, the communication method is provided in the wireless communication system for transmitting large amount of data such as general data, voice packets, or direct voice communication under a limitation of traditional bandwidth.

Figure 2:
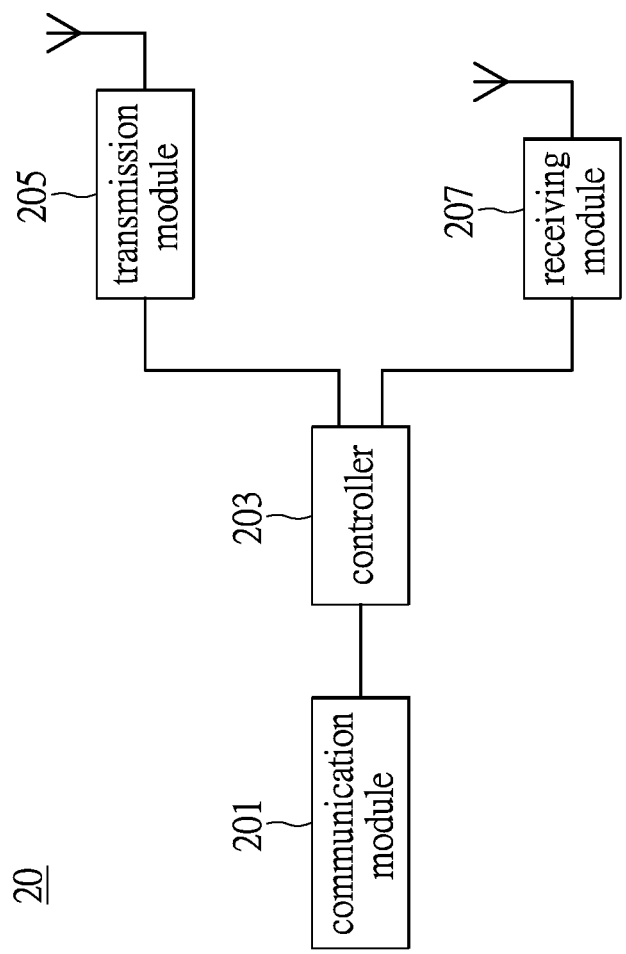
FIG. 2 shows a block diagram depicting a circuitry of a portable transceiver device in one embodiment of the disclosure.

FIG. 2 shows a block diagram of a circuit of a portable transceiver device in one embodiment of the disclosure. The essential circuit components of the portable transceiver device 20 include a controller 203 used to control operations of the portable transceiver device 20, and electrically connected with other circuits such as a communication module 201 that is in charge of near-end communication of the portable transceiver device 20, a transmission module 205 and a receiving module 207 that connect with the gateway device.

The communication module 201 performs a near-end wireless communication protocol, e.g. Bluetooth™ or WiFi™, for connecting or pairing with the user device. The portable transceiver device 20 acts as a node of the system. The transmission module 205 and the receiving module 207 of the portable transceiver device 20 utilize antennas and circuits to transmit and receive respectively under a wireless WAN communication protocol. In one embodiment of the disclosure, the wireless WAN communication protocol is such as the above-mentioned LoRa protocol adapted to IoT application. In the wireless communication system, the portable transceiver device 20 allows the user device to connect with a server via a gateway device, and establish a connection with another portable transceiver device for communication according to the wireless WAN communication protocol.

Figure 3:
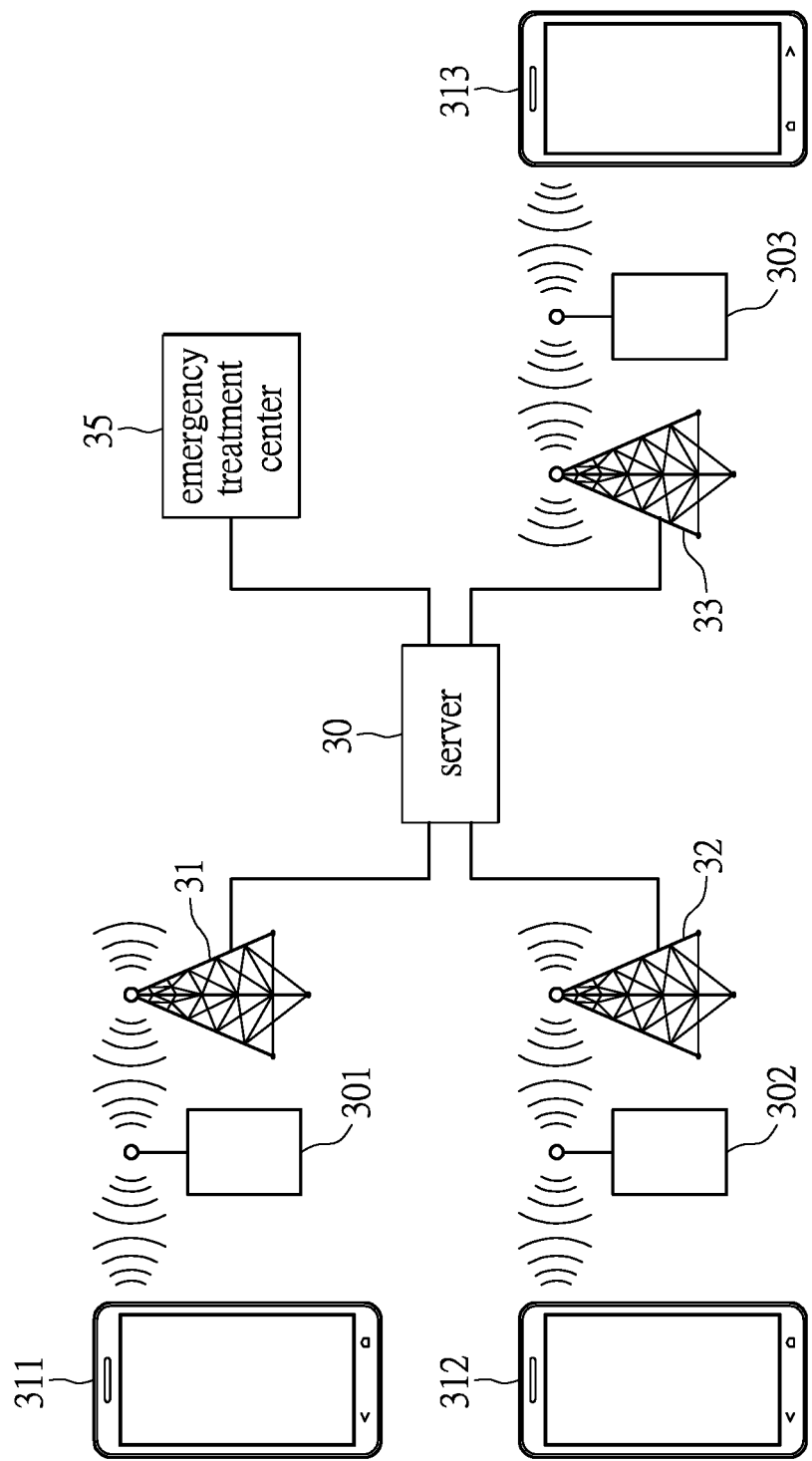
FIG. 3 shows a schematic diagram depicting the wireless communication system in one embodiment of the disclosure.

FIG. 3 shows a schematic diagram depicting an application of the wireless communication system according to one embodiment of the disclosure. The wireless communication system includes a central server 30, and gateway devices such as a first gateway device 31, a second gateway device 32 and a third gateway device 33. The system also includes the nodes formed by a first portable transceiver device 301 and a first user device 311. The first portable transceiver device 301 allows the first user device 311 to connect with the first gateway device 31 for linking to the server 30. Similarly, the second portable transceiver device 302 and the second user device 312 also form the nodes of the system. A third portable transceiver device 303 and a third user device 313 form other nodes of the system. The nodes can be communicated with each other by exchanging packets via the server 30.

In this embodiment, since the wireless communication system provides a solution other than the conventional scheme, the server 30 is able to provide other applications such as connecting with an emergency treatment center 35. If the conventional mobile communication fails, the user devices 311, 312 and 313 can be communicated with each other in the wireless communication system in case of emergency. For example, when the conventional mobile communication fails due to natural disasters or human factors, the wireless communication system that features low-power consumption, long-distance transmission and high scalability and can be temporarily installed to deal with emergency situations.

Figure 4:
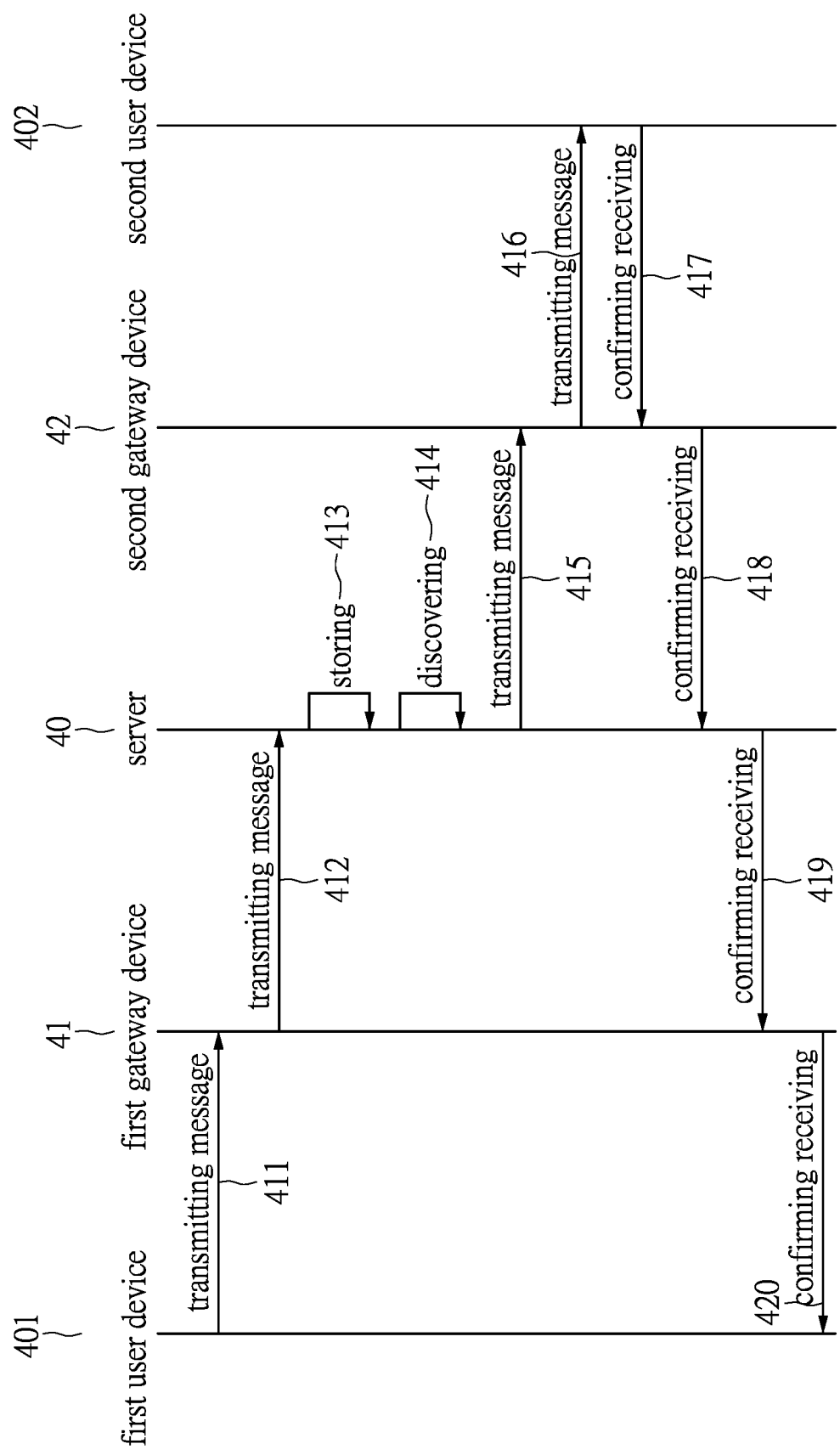
FIG. 4 shows a flow chart describing a communication method performed in the wireless communication system for delivering a message according to one embodiment of the disclosure.

In the wireless communication system, the gateway device periodically issues detection packets, e.g. a beacon to not only broadcast SSID of the gateway device, but to detect if a portable transceiver device exists. Therefore, the server can instantly receive a response and a search result when discovering a specific device. Reference is next made to FIG. 4 showing the communication method according to the embodiment of the disclosure.

In the process, a general text/picture or voice packets can be transmitted among a first user device (a first portable transceiver device 401, a first gateway device 41, a server 40, a second gateway device 42) and a second user device (a second portable transceiver device 402). The voice packets can be a recorded voice file that is a kind of data packet, and not the voice streaming of a direct voice communication.

In the beginning, the first user device 401 generates a message, e.g. data or voice packets, and then transmits the message to the first gateway device 41 via the first portable transceiver device (step 411). Then, the first gateway device 41 forwards this message to the server 40 (step 412). In the server 40, a software sequence is performed to determine that the message is general data, and the data is stored in a memory (step 413). Then the software sequence starts to discover according to a destination recorded in a header of the message (step 414).

In general, each of the gateway devices of the system issues detection packets periodically, and records the connected portable transceiver device(s). The record will be transmitted to the server 40 for discovering the destination(s) with respect to the connected portable transceiver device(s). For example, when the server 40 conducts a discovering process, it acknowledges that the second portable transceiver device is connected with the second gateway device 42. The message is then transmitted to the second gateway device 42 (step 415), and then the second gateway device 42 forwards the message to the second portable transceiver device (step 416). The message finally arrives at the destination, e.g. the second user device 402.

After that, the second user device 402 generates a confirmation message (step 417) and transmits the confirmation message to the first user device 401 (step 420) through the second gateway device 42, the server 40 (step 418), and the first gateway device 41 (step 419) sequentially. Thus, the wireless communication system achieves data transmission.

In the process, the gateway devices 41 and 42 act as the base stations of the wireless communication system. In an exemplary example, each base station can support multiple connected devices to upload data at the same time. These data can be uploaded to the server 40 or a specific back-end system for processing the data in chronological order. The back-end system is such as the emergency treatment center 35 described in FIG. 3.

Figure 5:
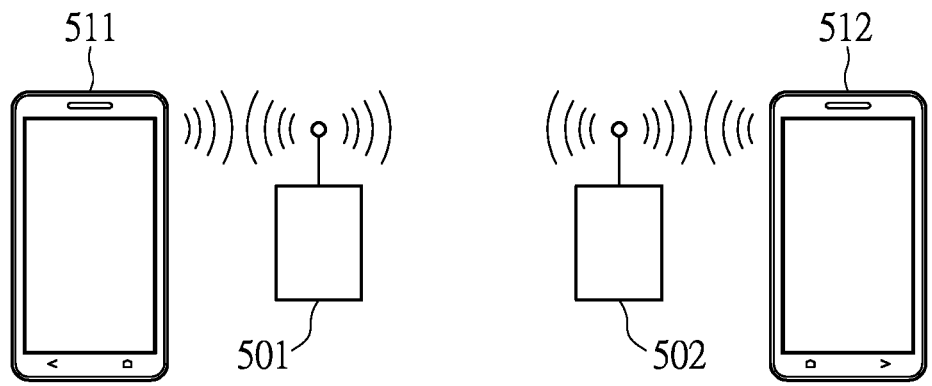
FIG. 5 shows a schematic diagram depicting two portable transceiver devices that conduct a point-to-point communication according to the embodiment of the disclosure.

In another embodiment, the portable transceiver device supports an Ad-Hoc mode communication. Reference is made to FIG. 5 showing a schematic diagram depicting a point-to-point communication process between two portable transceiver devices.

In the example, in the system without the server and the gateway device, where the traditional communication cannot work, two user devices 511 can still be operated under a specific wireless WAN communication protocol by individual portable transceiver devices 501 and 502. When the first user device 511 and the first portable transceiver device 501 have been connected or paired, the first user device 511 can conduct direct communication with the nodes formed by the second user device 512 and the second portable transceiver device 502.

Figure 6:
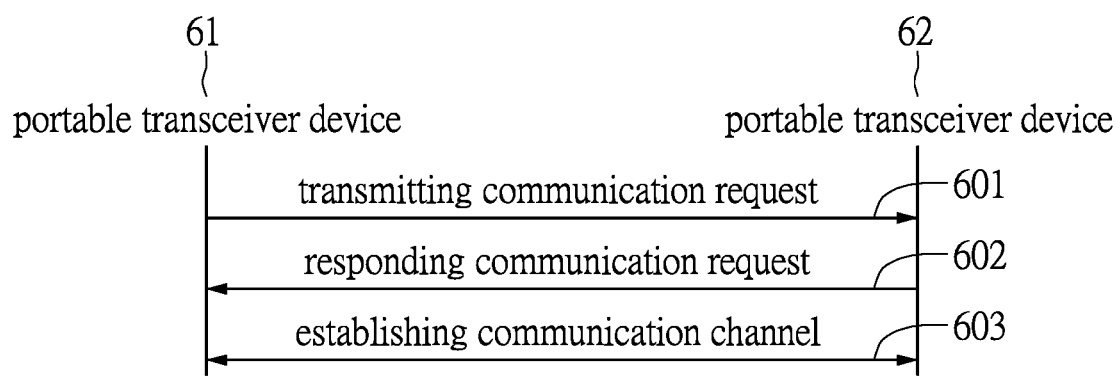
FIG. 6 shows a flow chart describing a process of establishing a point-to-point communication channel in one embodiment of the disclosure.

Before the communication between the first user device 511 and the second user device 512 is established, the two portable transceiver devices 501 and 502 can broadcast their own SSID through detection packets and discover the nearby portable transceiver devices to establish a communication channel. Reference is made to FIG. 6 which shows a flow chart establishing a point-to-point communication channel.

In the beginning, a first portable transceiver device 61 transmits a communication request through broadcast packets (step 601). However, the communication request can also be transmitted by unicasting. When a second portable transceiver device 62 receives the communication request, a response packet is generated (step 602) for establishing a communication channel between the nodes (step 603).

Figure 7:
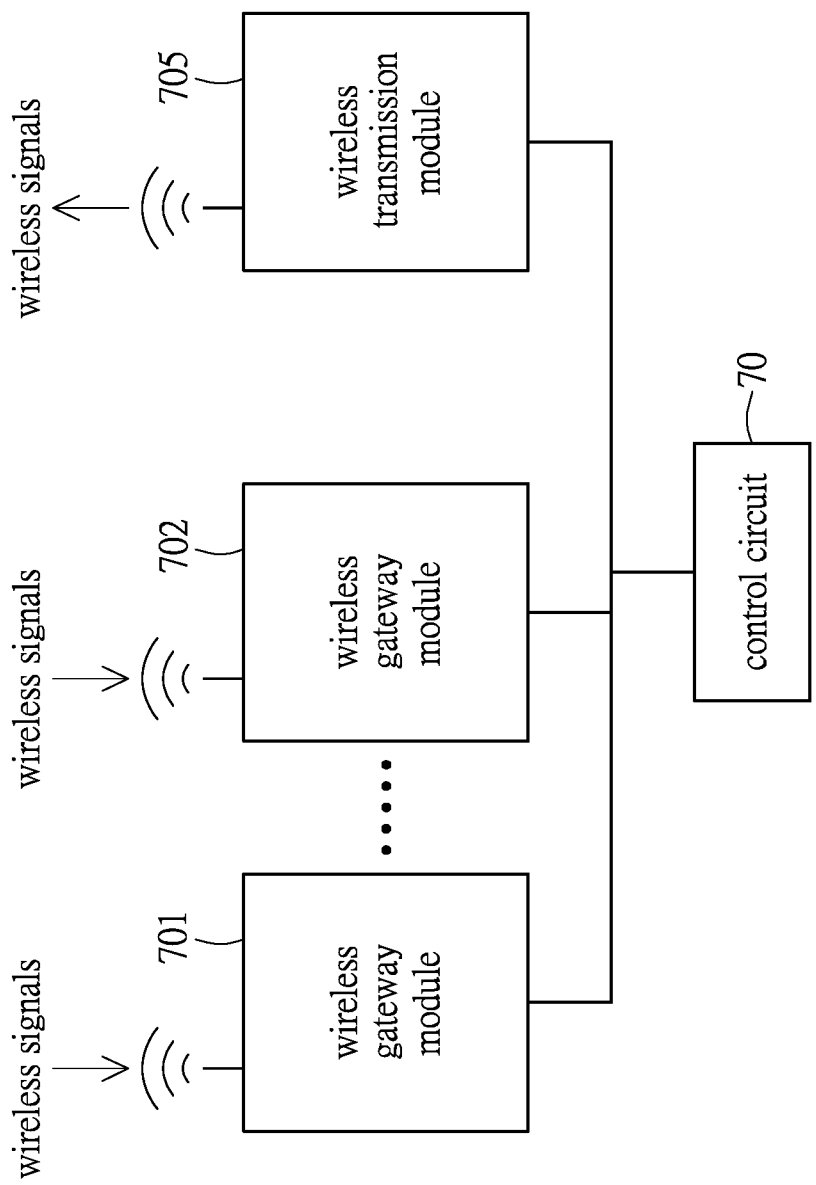
FIG. 7 shows a schematic diagram depicting a gateway device of the wireless communication system according to one embodiment of disclosure.
Figure 8:
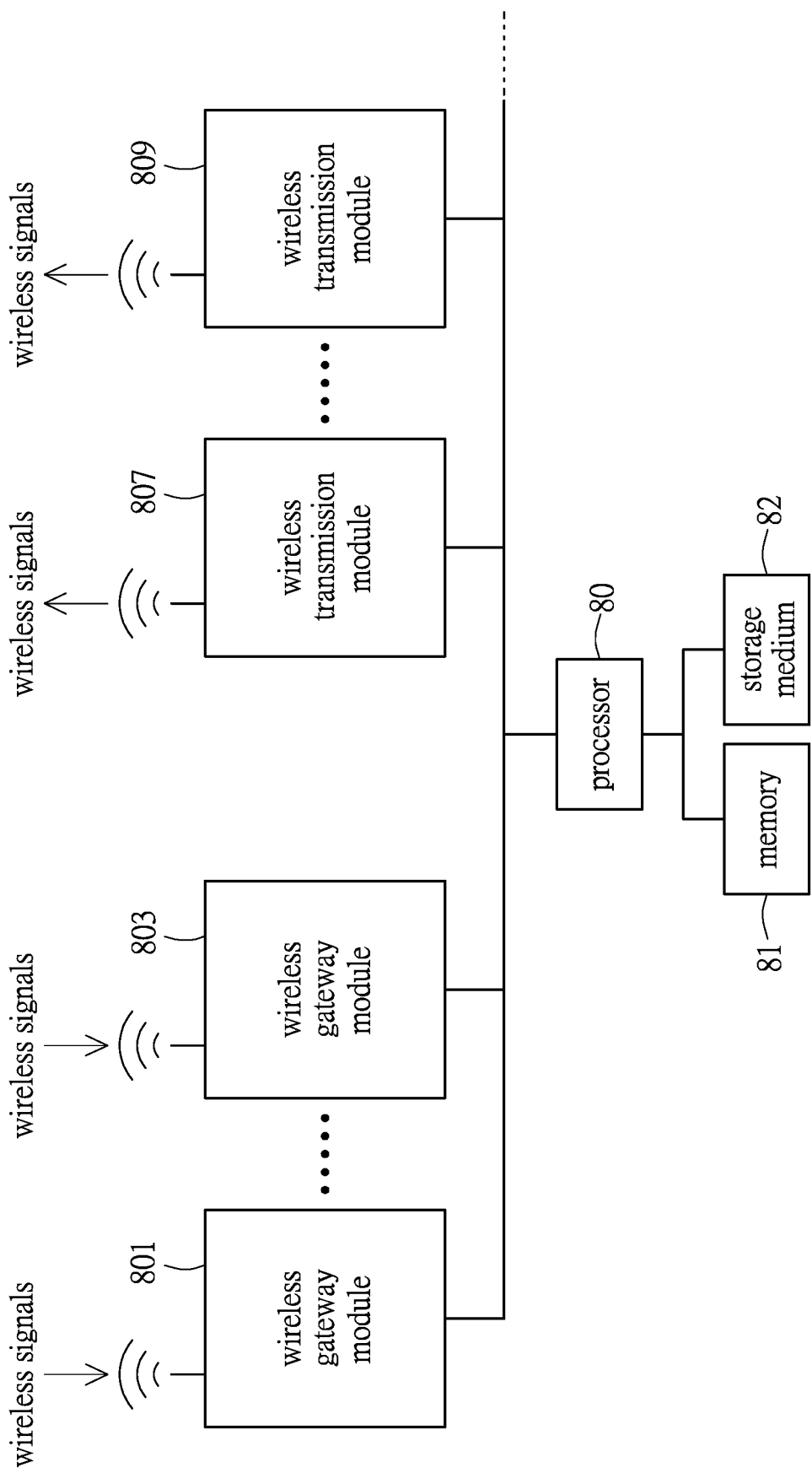
FIG. 8 shows one further schematic diagram depicting a gateway device of the wireless communication system according to one further embodiment of the disclosure.

According to the communication method in one embodiment of the disclosure, the gateway device includes one or more wireless gateway modules, at least one wireless transmission module and a control circuit. The wireless gateway module is able to connect with various terminal nodes via a multi-channel technology. The end node is exemplarily formed by the above-mentioned user device and portable transceiver device. Under the framework of the wireless communication system, a full-duplex wireless communication is supported. The wireless communication system embodies a LoRa protocol. FIG. 7 and FIG. 8 schematically show the gateway device according to the embodiments of the disclosure.

FIG. 7 shows a schematic diagram depicting a gateway device in a wireless communication system in one embodiment of the disclosure. The gateway device includes one or more wireless gateway modules 701 and 702, a wireless transmission module 705 and a control circuit 70. Two wireless gateway modules 701, 702 and one wireless transmission module 705 are shown in the embodiment. The wireless transmission module 705 is used to process messages transmitted from the wireless gateway modules 701, 702 to the nodes. It should be noted that the number of the devices or modules should not be construed as limiting the scope of the system. For example, a plurality of wireless transmission modules 705 can be adopted in the gateway device under specific requirements. The wireless gateway modules 701 and 702 support a multi-channel two-way communication protocol that is used to interconnect various terminal nodes, e.g. the portable transceiver devices. In the wireless communication system, the gateway device uses a one-way multi-channel communication function to receive message and would not need to wait as in the conventional two-way communication where transmitting and receiving functions share the same processing circuit. In the wireless communication system of the disclosure, the message is transmitted by the wireless transmission module 705, e.g. the message is transmitted to the portable transceiver device.

The wireless gateway modules 701 and 702 are used to connect with the portable transceiver device. The wireless gateway module can be a LoRa concentrator. However the communication protocol may not be limited to a specific protocol but can be WiFi™, Bluetooth™ or LPWAN.

The wireless transmission module 705 connected with one or more wireless gateway modules 701 and 702 performs data transmission via its internal circuits that are used to, for example, receive a transmission command from the control circuit 70, decide a transmission channel and transmit the message.

In one embodiment, the wireless transmission module 705 can be a Listen Before Talk (LBT) module that supports the LoRa protocol. The LBT module waits for a transmission command from the control circuit 70 when in operation. When receiving the transmission command, the LBT module analyzes the command for obtaining information such as a time stamp and a transmission channel. The LBT module then transmits message, e.g. ACK/Acknowledge responding to the terminal, through the transmission channel designated by the control circuit 70. The LBT mechanism can detect whether or not the channel is available by a clear channel assessment (CCA) scheme. Then, the LBT module can adjust the transmission time in a definite time range from one millisecond to ten milliseconds. Thus, any communication circuit adopting the LBT mechanism can sense and assess if the channel is free or non-free in advance. When the channel is free and available for transmission, the transmission function is then activated.

Furthermore, for expanding the signal coverage and application of the gateway device, a sufficient number of wireless gateway modules 701, 702 are required. The gateway device can provide more applications by increasing the number of the wireless gateway modules 701, 702. The number of the wireless transmission modules 705 can be increased for dealing with more data transmitted from the wireless gateway modules 701 and 702 via the multiple channels.

The control circuit 70 acts as a main control circuit for the gateway device. The control circuit 70 can be implemented by a circuit module, an integrated circuit, or an integration of software and hardware. The control circuit 70 connects with one or more wireless gateway modules 701 and 702 and the at least one wireless transmission module 705 via a bus or a wired or wireless connection line. The control circuit 70 determines a transmission time after receiving a message from one of the wireless gateway modules 701 and 702, and instructs the wireless transmission module 705 to transmit the message.

The control circuit 70 has a processor and an interface connecting with the wireless gateway module(s) and the wireless transmission module. The control circuit 70 performs the communication method. The message received by the control circuit 70 can be data packets to be transmitted. The packets include SYN/ACK signals. The control circuit 70 calculates a transmission time according to size of the packets, a timestamp in the packets, or including a time that the system needs to process the packets. A transmission request is accordingly generated to be arranged into a transmission queue with the message, then waiting to be transmitted.

After that, the control circuit 70 retrieves the transmission request and the data from the transmission queue according to the transmission time, and then transmits the transmission request and the data to the wireless transmission module 705. The wireless transmission module 705 transmits the message after deciding a transmission channel.

As mentioned above, the wireless gateway module (701, 702) can be a LoRa concentrator, and the wireless transmission module 705 can be an LBT module. In one aspect of the invention, one gateway device can connect with a plurality of communication modules that is constituted of the LoRa concentrators and LBT module for expanding the signal coverage and more applications. The LoRa concentrator also adopts the mechanism of Listen Before Talk. The control circuit 70 needs to control operations of the plurality of LoRa concentrators. For example, the control circuit 70 decides a transmission time and a transmission channel for every LoRa concentrator. It should be noted that the time that the LBT mechanism uses to assess if the channel is free or non-free should be considered in the transmission time. Therefore, the wireless communication system can be operated in a network environment with multiple LoRa concentrators. When the message is transmitted to the LBT module, the LBT module checks the status of the channel through the CCA process and activates the transmission process if the channel is free.

The gateway device adopts the LoRa concentrator that may be originally a concentrator supporting a two-way communication and able to receive the message from a terminal under a low-power WAN protocol. However, the gateway device in accordance with the disclosure is configured to be a one-way concentrator for cooperating with the one-way LBT module. In an exemplary example, the control circuit 70 connects with one LBT module and the plurality of LoRa concentrators. The control circuit 70 also allows the LoRa concentrators to connect with another LBT module. The signal coverage of the gateway device can be expanded by increasing the number of the LoRa concentrators or the LBT modules. The gateway device is also equipped with the LBT mechanism under this precise circuit arrangement.

The control circuit 70 controls the LoRa concentrator to receive data, and controls the LBT module to transmit data, which solves an issue of low efficiency due to simultaneously receiving and transmitting of one communication module. Since the gateway device adopts the LBT mechanism, a precise transmission time can be calculated by referring to the time stamp under operation of the LBT module.

FIG. 8 shows another schematic diagram of the gateway device of the wireless communication system in another embodiment of the disclosure. Under this framework of the system, the gateway device includes a plurality of wireless gateway modules 801 and 803 that are used to receive the messages generated by more than one portable transceiver devices. The wireless gateway module (801, 803) can also be a LoRa concentrator that is connected with the end node via a wireless communication protocol, e.g. WiFi™, Bluetooth™, or LPWAN.

The gateway device includes a plurality of wireless transmission modules 807 and 809. Each of the wireless transmission modules is able to process the message received from the wireless gateway modules 801 and 803. When the gateway device uses the one-way multi-channel technology to receive the message, the gateway device would not be affected by the aforementioned issue caused in the two-way communication. Since the gateway device adopts one or more wireless transmission modules 807 and 809, the gateway device has great flexibility and scalability.

In the current example, the control circuit includes a processor 80, a memory 81 and a storage medium 82. In addition to managing the modules, the processor 80 processes the received data and the data to be transmitted. The memory 81 is used to buffer the incoming and outgoing signals. The storage medium 82 records the requisite data for operating the device, and also configuration of data transmission for the gateway device to each node of the system. The information allows the gateway device to use the time slots and the transmission channels more efficiently in the communication process, and also achieve full-duplex communication.

Figure 9:
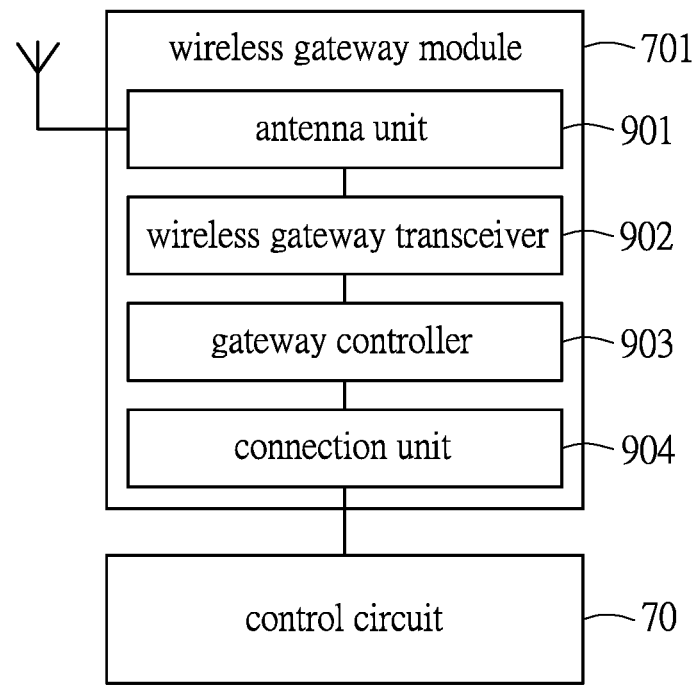
FIG. 9 shows a block diagram of a circuit of a wireless gateway module of the gateway device in one embodiment of the disclosure.

In FIG. 9, a schematic diagram of circuits of a wireless gateway module of the gateway device is shown. A wireless gateway module 701 is shown in the diagram. The wireless gateway module 701 has an antenna unit 901, a wireless gateway transceiver 902, a gateway controller 903 and a connection unit 904. The wireless gateway module 701 can be operated among different network sections. The wireless gateway module 701 connects with one or more terminal nodes for receiving the messages from the nodes by a multi-channel technology. The antenna unit 901 is used to receive RF signals from the terminal nodes. The wireless gateway transceiver 902 integrates the functions of receiving and transmitting of the wireless gateway module 701. The wireless gateway transceiver 902 is able to process the RF signals from the terminal nodes and extracts information and time stamp from the message. The gateway controller 903 controls operation of the wireless gateway module 701, including the time for receiving signals of the antenna unit 901 and the wireless gateway transceiver 902. The gateway controller 903 also transmits the signals to the control circuit 70 through the connection unit 904 and the related connection line.

Figure 10:
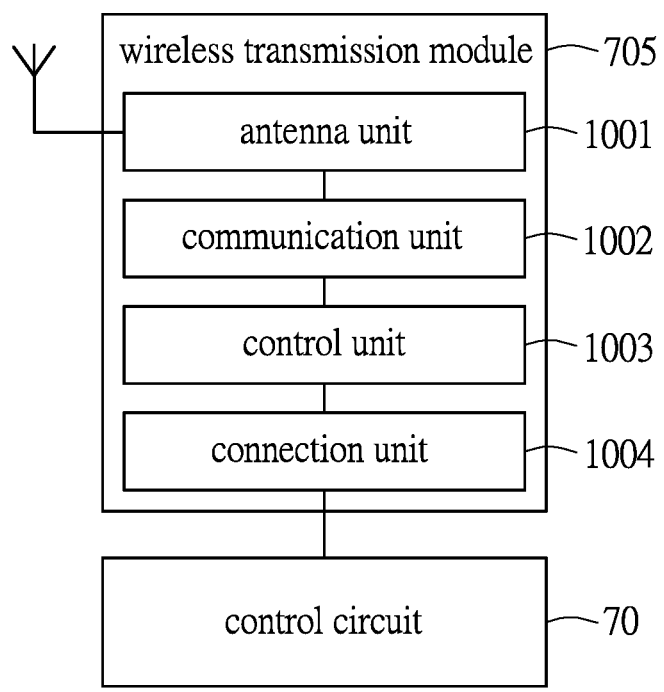
FIG. 10 shows a block diagram of a circuit of a wireless transmission module of the gateway device in embodiment of the disclosure.

FIG. 10 shows a block diagram depicting circuits of the wireless transmission module of the gateway device according to one embodiment of the disclosure. The frequency for operation can be selected according to a scanning result made by the wireless transmission module 705. The wireless transmission module 705 includes an antenna unit 1001, a communication unit 1002, a control unit 1003 and a connection unit 1004. The control unit 1003 is the main circuit for controlling the wireless transmission module 705. The control unit 1003 is electrically connected with the control circuit 70 via the connection unit 1004 so as to receive the command generated by the control circuit 70. For example, when the wireless transmission module 705 is in an idle state or not executing any command, the control circuit 70 may generate a command to demand the wireless transmission module 705 to scan the signals with a specific frequency. The antenna unit 1001 is driven by the communication unit 1002 to scan the signal with a specific frequency and to acquire signal information therefor.

The communication unit 1002 is a driving circuit of the antenna unit 1001 and performs a specific wireless communication protocol. The communication unit 1002 drives the antenna unit 1001 to be operated under a frequency for scanning the signals and obtaining information such as received signal strength indication (RSSI). The information is then transmitted to the control circuit 70 via the connection unit 1004, e.g. a bus or a specific connection. The control circuit 70 creates a scan table to record the scanning result and stores the scan table to a memory, or transmits it to an external host.

Figure 11:
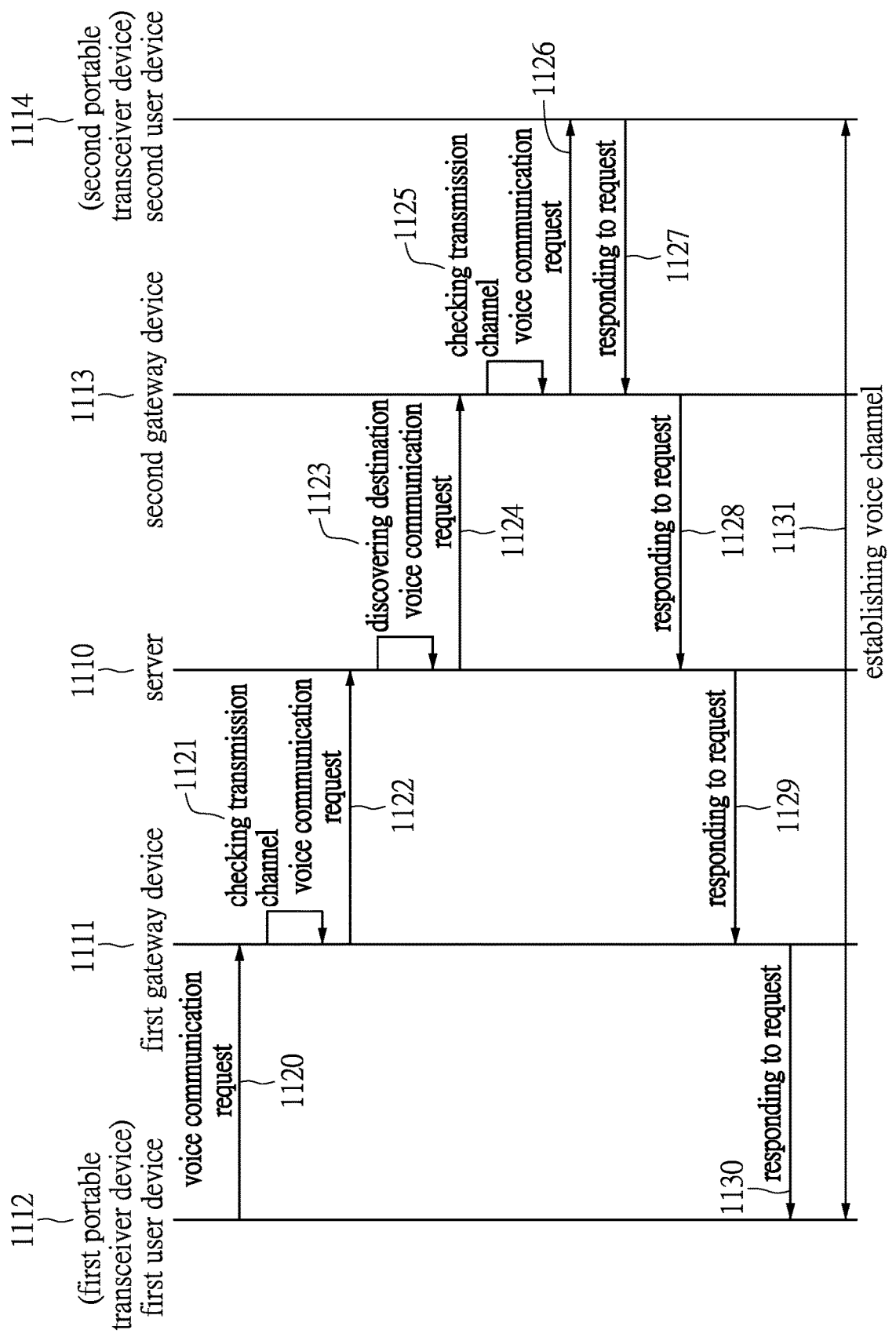
FIG. 11 shows a flow chart describing a process of voice communication implemented by the wireless communication system according to one embodiment of the disclosure.

FIG. 11 shows a flow chart describing a process of voice communication performed by the wireless communication system according to one embodiment of the disclosure. A direct voice communication is implemented between two end users in the wireless communication system.

In the beginning, a first user device 1112 issues a voice communication request via a first portable transceiver device (step 1120). The request records a destination. The first gateway device 1111 receives the request and checks if a transmission channel (TX) is available or occupied by other connection (step 1121). If an available transmission channel is determined, the voice communication request is transmitted to a server 1110 (step 1122).

In the server 1110, the server 1110 discovers an address of the second portable transceiver device according to the destination (step 1123). If a second gateway device 1113 that connects with the destination, e.g. the second portable transceiver device, is determined, the voice communication request is sent to the second gateway device 1113 (step 1124). The second gateway device 1113 checks if any transmission channel is available (step 1125). If one available transmission channel is determined, the voice communication request is transmitted to the second portable transceiver device (step 1126). Finally, the second user device 1114 receives this request.

In the process, if the transmission channel for the first gateway device 1111 or the second gateway device 1113 is occupied, the communication channel for voice communication cannot be established. A message with unavailable communication is notified to the user device. On the contrary, if the voice communication request arrives at the destination, e.g. the second user device 1114, the second user device 1114 responds to this request via the connected second portable transceiver device. As shown in the diagram, according to steps 1127, 1128, 1129 and 1130, the response will be transmitted to the first user device 1112. Thus, a communication channel is established there-between. The communication channel is such as a voice channel established in step 1131. The user devices 1112 and 1114 will then conduct a direct voice communication by a streaming process via the corresponding portable transceiver devices and the server 1110.

Figure 12:
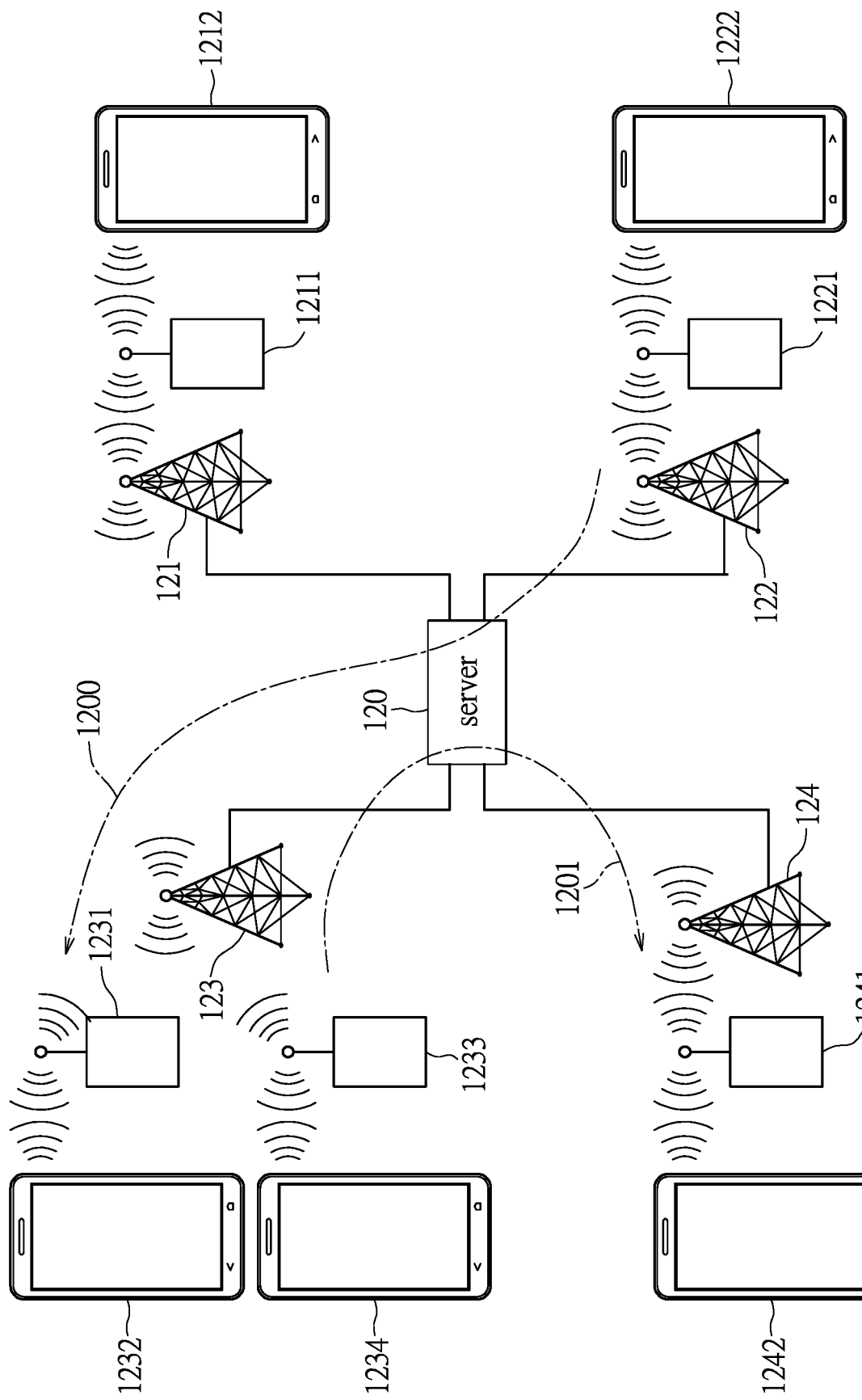
FIG. 12 shows a schematic diagram describing an operation of the wireless communication system according to one embodiment of the disclosure.

According to the embodiment of the wireless communication system shown in FIG. 12, the gateway device connected with a server 120 includes one or more wireless gateway modules that connect with the portable transceiver devices by a multi-channel technology, and at least one wireless transmission module. When the transmission channel (TX) is unavailable and occupied by another connection, the gateway device should wait until it is available. However, even if the transmission channel is unavailable, the receiving channel (RX) can still operate under the full-duplex function.

The first user device 1212 is paired with a first portable transceiver device 1211 so as to form a node of the system. This node connects with the server 120 via a first gateway device 121. Further, a second user device 1222 connects with a second portable transceiver device 1221 for forming another node that is connected with the server 120 via a second gateway device 122. A communication request is generated and forwarded to a destination through the server 120. In this example, the request is transmitted to a third user device 1232 that is connected with a third portable transceiver device 1231 via a third gateway device 123. A communication path 1200 is established between the second user device 1222 and the third user device 1232.

The communication path 1200 indicates that the third portable transceiver device 1231 is a receiver using a transmission channel of the third gateway device 123. Since a receiving channel that is in charge of data transmission and a transmission channel to a fourth gateway device 124 are not occupied, the fourth user device 1234 and the fourth portable transceiver device 1233 connected with the third gateway device 123 can still use this available transmission channel. As shown in the present diagram, the packets can be transmitted via the third gateway device 123 and the server 120 to the fourth gateway device 124 that is connected the fifth portable transceiver device 1241 via a communication path 1201. The fifth user device 1242 therefore receives the packets.

Figure 13:
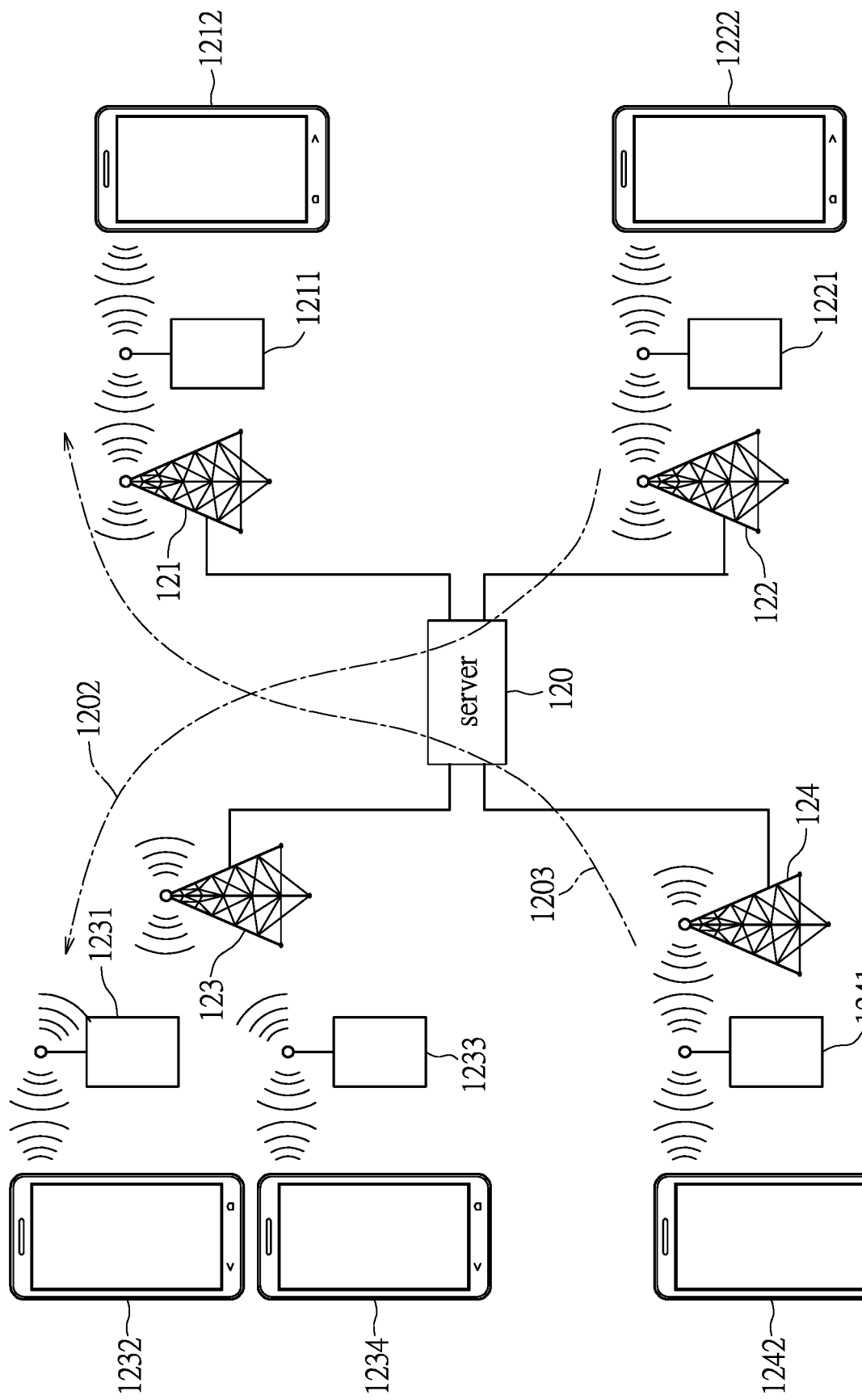
FIG. 13 shows another schematic diagram describing the operation of the wireless communication system according to one further embodiment of the disclosure.

FIG. 13 shows another schematic diagram depicting the operation of the wireless communication system in another embodiment of the disclosure.

The node formed by the second user device 1222 and the second portable transceiver device 1221 generates communication packets. The communication packets are transmitted to the third gateway device 123 via the second gateway device 122 and server 120, and then arrive at the node formed by the third portable transceiver device 1231 and the third user device 1232. A communication path 1203 is formed to conduct a direct voice communication. On the other hand, another communication path 1202 is formed between the node formed by the first user device 1212 and the first portable transceiver device 1211 and the node formed by the fifth portable transceiver device 1241 and the fifth user device 1242. The voice communication can be conducted via the communication path 1202, and the server 120 is in charge of exchanging voice streams.

In the wireless communication system, the portable transceiver devices may detect at least two connectable gateway devices at the same time, and a signal quality is therefore referred to to decide on the connected gateway device. The signal quality indicates one of RSSI, data loss rate and data rate, or any combination thereof. Furthermore, when the user brings the user device and the portable transceiver device moves into a range covered by different signal coverages of two or more gateway devices, the communication circuit of the portable transceiver devices is configured to decide a handover timing according to the signal quality with respect to each of the at least two available gateway devices.

In conclusion, according to the embodiments relating to the wireless communication system, the communication method and the portable transceiver device, the system preferably applies LoRa protocol or the similar protocol that can be adapted to IoT system. Since the communication protocol applied in IoT system features in low-power consumption and long-distance transmission, not for the purpose of transmitting a large amount of data, the communication method is provided to deliver the voice packets or conduct a direct voice communication for specific applications and requirements. It should be noted that the voice communication may be operated under an unlicensed frequency band. For example, the system can be adapted to an emergency telephony system. The system can also be used for communication in a small area or the dead zone that the traditional communication system fails to reach. Furthermore, with a central serve, the system can support handover among the base stations. When a portable transceiver device is paired with a user device, this user-end system can be used as a telephone for internal communication, e.g. an indoor telephony extension system.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wireless communication system, comprising:
   a server;
   a plurality of gateway devices that connect with the server via a wireless network;
   a plurality of portable transceiver devices, wherein each of the portable transceiver devices allows a user device to connect with the server via one of the gateway devices for connecting with another portable transceiver device, so as to establish a communication channel there-between;
   wherein the wireless communication system performs a communication method including:
      a first portable transceiver device issuing a message with a destination and transmitting the message to the server via a first gateway device connected with the first portable transceiver device;
      the server discovering an address of a corresponding second portable transceiver device according to the destination so as to obtain a second gateway device connected with the second portable transceiver device; and
      the server transmitting the message to the second portable transceiver device via the second gateway device according to the address of the second portable transceiver device;
   wherein, when the user device conducts a direct voice communication via the first portable transceiver device, the communication method further includes:
      generating a communication request, wherein the first gateway device determines whether or not any transmission channel is available after the first gateway device receives the communication request;
      transmitting the communication request to the server if the first gateway device discovers an available transmission channel;
      when the server discovers an address of the second portable transceiver device and the corresponding second gateway device, the second gateway device determines whether or not the transmission channel is available; and
      transmitting the communication request to the second portable transceiver device when the second gateway device determines an available transmission channel; and a communication channel is established between the first portable transceiver device and the second portable transceiver device so as to conduct the direct voice communication over the communication channel.

2. The system as recited in claim 1, wherein, each of the portable transceiver devices performs a near-end wireless communication protocol for connecting with the user device; each of the portable transceiver devices, one of the gateway devices and the server are communicated with each other via a LoRa communication protocol.

3. The system as recited in claim 2, wherein each gateway device includes:
   one or more wireless gateway modules, connected with one or more portable transceiver devices via a multi-channel technology, and used to receive a message issued by each of the portable transceiver devices;
   at least one wireless transmission module, transmitting the message received by the wireless gateway module after deciding a transmission channel; and
   a control circuit, controlling the one or more wireless gateway modules and the at least one wireless transmission module that are connected with the control circuit via a connection line.

4. The system as recited in claim 3, wherein the wireless gateway module is a LoRa concentrator, and the wireless transmission module is an LBT module supporting LoRa communication; in the wireless communication system, the LBT module processes the message received by the one or more LoRa concentrator through the control circuit; the LoRa concentrator of the wireless communication system is configured to be a one-way concentrator that is assembled with the one-way LBT module.

5. The system as recited in claim 2, wherein, when the portable transceiver device detects at least two available gateway devices, a signal quality is referred to to decide on one of the gateway devices for establishing the communication channel, wherein the signal quality indicates one selected from RSSI, a data loss rate and a data rate, or any combination thereof.

6. The system as recited in claim 5, wherein, a communication circuit of each of the portable transceiver devices is configured to decide a handover timing according to the signal quality with respect to each of the at least two available gateway devices.

7. The system as recited in claim 1, wherein the server connects with an emergency treatment center.

8. The system as recited in claim 1, wherein, when the first portable transceiver device transmits general data or voice packets, the general data or the voice packets are firstly buffered into a memory after the server receives the general data or the voice packets; the general data or the voice packets are transmitted from the server after discovering the second portable transceiver device.

9. The system as recited in claim 1, wherein, if the transmission channel of the gateway device connected with the first and the second portable transceiver devices that communicate with each other is occupied, a message indicating unavailable communication is notified to the user device.

10. A portable transceiver device adapted to the wireless communication system according to claim 1, comprising:
   a controller used to control the portable transceiver device;
   a communication module, electrically connected with the controller, performing a near-end wireless communication protocol to connect with the user device;
   a transmission module and a receiving module that perform a wireless WAN communication protocol;
   wherein, in the wireless communication system, the portable transceiver device allows the user device to connect with a server via a gateway device so as to establish a connection with another portable transceiver device for communication according to the wireless WAN communication protocol;
   wherein:
   the portable transceiver device issues a message with a destination, and transmits the message to the server via the gateway device connected with the portable transceiver device;
   the server discovers an address of the another portable transceiver device according to the destination and obtains the gateway device connected with the another portable transceiver device; and
   the server transmits the message via the gateway device connected with the another portable transceiver device;

wherein, when the user device conducts a direct voice communication via the portable transceiver device, the communication method further includes:
    the portable transceiver device generating a communication request, and the gateway device determining whether or not a transmission channel is available after the gateway device receives the communication request;
    transmitting the communication request to the server when the transmission channel with respect to the gateway device is available; and
    the server discovering an address of the another portable transceiver device and a gateway device connected thereto, and transmitting the communication request to the another portable transceiver device when the gateway device connected with the another portable transceiver device determines an available transmission channel; and a communication channel is established between the portable transceiver device and the another portable transceiver device so as to conduct the direct voice communication over the communication channel.

11. A communication method operating in a wireless communication system that includes a server, a plurality of gateway devices and a plurality of portable transceiver devices, and each portable transceiver device allows a user device to connect with the server via one of the gateway devices so as to connect with another portable transceiver device for establishing a communication channel therebetween, wherein the communication method comprises:
    a first portable transceiver device issuing a message with a destination, and the message being transmitted to the server via a first gateway device connected with the first portable transceiver device;
    the server obtaining a second gateway device connected with the second portable transceiver device after discovering an address of the second portable transceiver device according to the destination; and
    the server transmitting the message to the second portable transceiver device via the second gateway device according to the address of the second portable transceiver device;
    wherein, when the user device conducts a direct voice communication via the first portable transceiver device, the communication method further includes:
        generating a communication request that is received by the first gateway device, and the first gateway device determining whether or not any transmission channel is available;
        transmitting the communication request to the server when the transmission channel with respect to the first gateway device is available;
        determining, by the second gateway device, whether or not any transmission channel is available when the server discovers an address of the second portable transceiver device and the corresponding second gateway device; and
        transmitting the communication request to the second portable transceiver device when the transmission channel with respect to the second gateway device is available; and a communication channel is established between the first portable transceiver device and the second portable transceiver device for conducting the direct voice communication over the communication channel.

12. The method as recited in claim 11, wherein, each of the portable transceiver devices connects with the user device by a near-end communication method, and each of the portable transceiver devices, one of the gateway devices and the server are communicated via a LoRa protocol.

13. The method as recited in claim 12, wherein the gateway device connected with each portable transceiver device and the server includes:
    one or more wireless gateway modules that connect with one or more portable transceiver devices via a multi-channel technology, so as to receive the message generated by each of the portable transceiver devices;
    at least one wireless transmission module transmitting the message received by each of the wireless gateway modules after deciding a transmission channel; and
    a control circuit controlling the one or more wireless gateway modules and the at least one wireless transmission module that connect with the control circuit via a connection line.

14. The method as recited in claim 12, when the portable transceiver device detects at least two available gateway devices, a signal quality is referred to to decide on one of the gateway devices for establishing the communication channel, wherein the signal quality indicates one selected from RSSI, a data loss rate and a data rate, or any combination thereof.

15. The method as recited in claim 14, wherein, a communication circuit of each of the portable transceiver devices is configured to decide a handover timing according the signal quality with respect to each of the at least two available gateway devices.

16. The method as recited in claim 11, wherein, when the first portable transceiver device transmits general data or voice packets, the general data or the voice packets are firstly buffered into a memory after the server receives the general data or the voice packets; the general data or the voice packets are transmitted from the server after discovering the second portable transceiver device.

17. The method as recited in claim 11, wherein, if the transmission channel of the gateway device connected with the first and the second portable transceiver devices that communicate with each other is occupied, a message indicating unavailable communication is notified to the user device.

* * * * *